United States Patent [19]

Inoue

[11] Patent Number: 4,641,251
[45] Date of Patent: Feb. 3, 1987

[54] ROBOT

[75] Inventor: Kiyoshi Inoue, Tokyo, Japan

[73] Assignee: Inoue-Japax Research Incorporated, Tokyo, Japan

[21] Appl. No.: 466,521

[22] Filed: Feb. 15, 1983

[30] Foreign Application Priority Data

Feb. 16, 1982 [JP] Japan .................................. 57-22117
Feb. 18, 1982 [JP] Japan .................................. 57-23565

[51] Int. Cl.$^4$ ............................................. G05B 19/42
[52] U.S. Cl. .................................... 364/513; 364/191; 364/424; 901/1; 901/46
[58] Field of Search ........................ 364/513, 191–193, 364/478, 167–171, 424; 901/1, 9, 10, 40, 49, 50, 42; 414/4, 5, 730; 318/568, 573, 580, 587

[56] References Cited

U.S. PATENT DOCUMENTS

| | | | |
|---|---|---|---|
| 4,028,533 | 6/1977 | Matsubara | 901/1 X |
| 4,086,522 | 4/1978 | Engelberger et al. | 364/513 X |
| 4,119,900 | 10/1978 | Kremnitz | 901/1 X |
| 4,263,538 | 4/1981 | Richiardi | 318/573 X |
| 4,332,989 | 6/1982 | Nicolaisen | 901/49 X |
| 4,360,886 | 11/1982 | Kostas et al. | 364/513 X |
| 4,385,358 | 5/1983 | Ito et al. | 364/513 |

OTHER PUBLICATIONS

Marce et al.—"A Semi-Autonomous Remote Controlled Mobile Robot"—Industrial Robot—Dec. 1980.
Simpson—"Research at NBS-Seeking Generic Technology for the Automated Shop"—Dimensions/NBS—May/Jun. 1981.

Primary Examiner—Joseph Ruggiero
Attorney, Agent, or Firm—Roberts, Spiecens & Cohen

[57] ABSTRACT

A robot, particularly an industrial robot for performing predetermined tasks in accordance with given programs. When an operating portion of the robot encounters an unexpected obstacle, the robot must immediately stop the motion of the operating portion to prevent the collision with obstacle. For this purpose, the robot is provided with subcontrol units for individually controlling each operating portion of the robot as well as a main control unit for performing overall control of the robot. The subcontrol units serve to control such extra operations other than the inherent operations to carry out the prescribed tasks. Each operating portion is equipped with various detecting devices for sensing obstacles. The subcontrol units are made operative in accordance with outputs from the corresponding detecting devices. As obstacles, there are included humans, gases, radiation, etc. in addition to various objects. This invention can be applied to a robot having a learning function.

29 Claims, 16 Drawing Figures

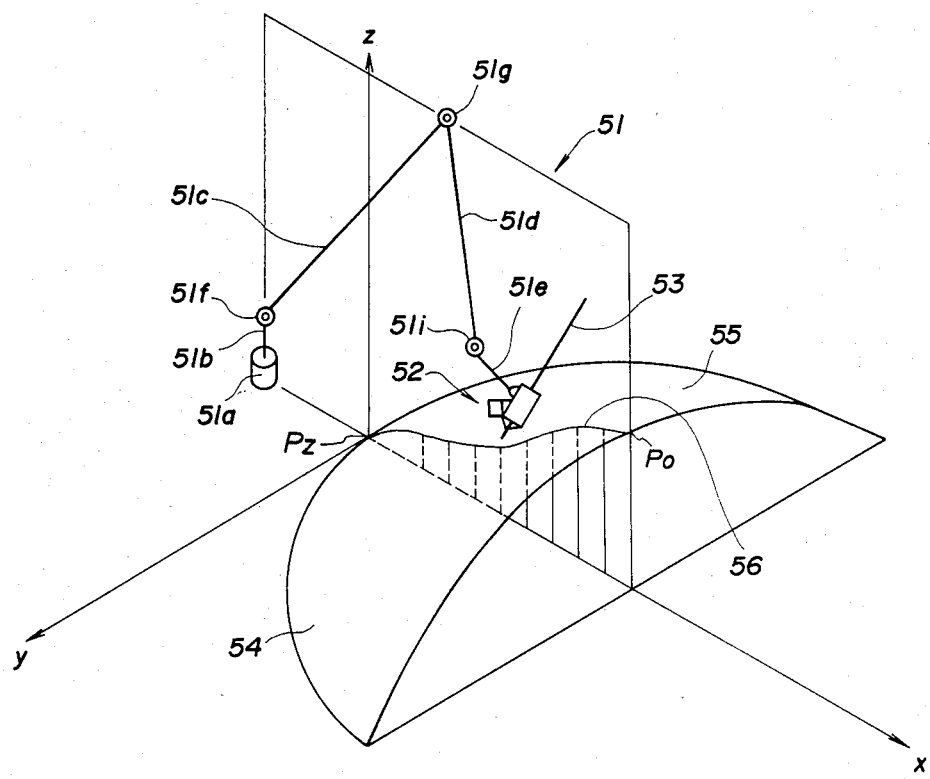
F I G. 14

ROBOT

BACKGROUND OF THE INVENTION

1. Field of the Invention

The present invention relates to a robot, and particularly to an industrial robot which is provided with a main control unit for performing overall control of the robot and subcontrol units for individual control of each operating portion. This invention further relates to a robot in which the above subcontrol units have a learning function; namely, when the operating portion is first moved by an external force, its course of motion is memorized and thereafter the same motion is repeated.

2. Description of the Prior Art

At present, many and various robots are used in broad industrial fields including factories and the like, which robots serve to execute various tasks, in like manner such as a human being, as carrying an article with the hand, assembling a product, welding, painting, etc. In such robots, the working process is first programmed and simulated by digital and analog apparatus, and the robot is operated by means of a servo system. If errors happen to be detected in its operation or positioning or the like during the operating cycle, the errors are fed back to further control each operating portion so that no errors are detected any longer. Recently, a robot having a learning function has been further developed. In this robot, it is not necessary to program the operational course of the robot, but once the robot is moved by an external force, the robot itself memorizes the course of motion, and thereafter the robot can repeat the motion along the same course.

Conventionally, robots have been principally used to perform simple repetitive tasks under severe conditions such as harmful or dangerous environments, in place of human beings. However, with advancing of the function of the robot as described above, the robot is frequently used to perform tasks in cooperation with workers in the factory. Thus, some unexpected accidents may occur when a worker collides with the robot when he happens to approach the robot carelessly or when the robot moves suddenly. The robot may be also damaged in such a case. Or else, an article or a product may be broken when the robot collides with it. To prevent these accidents, various safety devices are incorporated by the conventional robots.

However, one defect in the conventional robots is that the responsive speed of a safety device is slow. That is to say, this slow response is caused by a fact that when the detecting device attached to the robot detects the approach of object, a detection signal is sent to a control unit for integrally controlling the entire robot, where the signal is discriminated and processed. Thereafter, the robot is wholly stopped or only the operating portion approaching the object is stopped in accordance with a command from the control unit. However, since the above control unit is provided with a lot of complicated programs to make the robot execute various given tasks, it takes a long time before the safety device is made operative in accordance with the signal from the detecting device.

A second defect of the conventional robot is that the detecting devices for detecting the approach to or contact with external objects have their own dead angles, which causes the above safety device not to become operative. In other words, the area where the detecting device of the robot can sense the ambient objects is ordinarily limited to only the operating range of the hands and arms, which are the operating portions of the robot and their moving directions. Consequently, there is a problem that, when workers or other objects enter into the dead angles of the detecting devices of the robot, the approach and contact sensing functions of the robot do not operate.

To prevent the above-mentioned collision or contact and to secure the safety and accurate operations, the robot has to be equipped with detecting devices without any dead angles. As precise and high technical operations are required, the robot has to be more complicated, which results in increase of dead angles. Although a number of detecting devices or sensing apparatuses may be attached to eliminate these dead angles, it is impossible to completely eliminate the dead angles due to limitation of the number of detecting devices.

A third defect is that daily maintenance is annoying as the robot becomes complicated, so that in case of failure or the like, it is difficult to find the trouble and repair it easily.

A fourth defect is that even in the robot having a learning function, an extremely large capacity control unit and high speed operation are inevitable to realize the learning function. Moreover, in the robot which is equipped with a plurality of operating portions, a further large capacity and high-speed control unit is required to make each operating portion learn the independent different operations. Thus, the robot itself has to be become extremely large and, accordingly, expensive.

SUMMARY OF THE INVENTION

It is the first object of the present invention to provide a smart robot in which when any of the operating portions approaches or contacts the object, the operation of the operating portion is immediately and accurately stopped or the operating portion is moved away from the object. To accomplish this objective, in accordance with the present invention, subcontrol units for individually controlling each operating portion as well as a main control unit for overall control of the robot are provided. When any of the operating portions approaches or contacts the object, the detecting device senses it and sends a detection signal to the subcontrol unit which is equipped in the operating portion. The subcontrol unit then sends a command signal to the operating portion in order to temporarily stop the operation thereof or move it away from the object independently of the main control unit. With such a construction, each operating portion can be controlled accurately at a high responsive speed of less than 10 msec. The program of the main control unit can be, therefore, simplified.

The second object of the present invention is to eliminate the dead angle of the detecting devices which detect when the robot approaches or contacts an external object. For this purpose, in an embodiment according to the invention, the above detecting device comprises a plurality of wires which are attached on the surface of the body of the robot, especially the operating portion, and a voltage detector for detecting the change of the voltage applied to the above wires when the robot comes into contact with the other object. In another embodiment, the above-mentioned detecting device comprises a first electrode of a conductive material which covers the surface of the body of the robot, particularly the operating portion, an elastic dielectric material which covers the surface of the first electrode, a second electrode of a flexible conductive material which covers the surface of the dielectric material, an elastic insulating material which covers the surface of the second electrode, and an electrostatic capacity detector for detecting the change in electrostatic capacity between the first and second electrodes when the robot contacts the other object. In still another embodiment, the above-stated detecting device comprises an electrostatic capacity detecting apparatus which serves to measure the electrostatic capacity between the robot body, especially the operating portion and the ambient object which may contact therewith. In still another embodiment, the detecting device comprises a generator for generating a magnetic field around the robot body, especially the operating portion, and a detecting apparatus for detecting change in the above-mentioned magnetic field.

Detection signals from these detecting devices are sent to the subcontrol units which are attached to each operating portion and are processed thereby. The operation of each operating portion is temporarily stopped or the operating portion is moved away from the object in response to only a command signal from the subcontrol unit independently of the main control unit.

The third object of the invention is to provide a robot in which the daily maintenance is not complicated and, in case of failure, the faulty portion can be easily found. This object can be accomplished by providing the subcontrol unit for each operating portion as described above. That is to say, if a failure of the operation of any one of the operating portions is found, only this operating portion and the corresponding subcontrol unit are to be inspected.

The fourth object of the invention is to provide a robot in which each of the above-mentioned subcontrol units has a learning function. The learning function has to be performed by means of a relatively small control unit which has a small capacity for this purpose. To accomplish this object, according to the invention, the learning function comprises the steps of obtaining the course of movement at the particular point on the operating portion when it is moved by an external force, dividing this course into a plurality of appropriate intervals, replacing a number of subcourses of movement which are derived in correspondence with each interval by the straight lines or the circular arcs which are approximate to them, and moving the above particular point along the course thus replaced.

Still another object of the invention is to provide a robot in which each operating portion can respond immediately depending upon changes in various external circumstances, as well as to prevent collision with obstacles. To attain this object, in accordance with the invention, the different detecting devices are attached to the robot, which devices can detect the various changes in external environment such as temperature, pressure, light, sound, gases, humidity, magnetic force, radiation, etc. in accordance with the purposes to use the robot, besides the approach or contact with other objects.

These and other objects, features and advantages of the present invention will be more apparent from the following description of preferred embodiments with the accompanying drawings.

BRIEF DESCRIPTION OF THE DRAWINGS

FIG. 14 is a perspective view showing the function of the robot for welding, which robot is provided with a learning function;

DETAILED DESCRIPTION OF THE PREFERRED EMBODIMENTS

Figure 1:
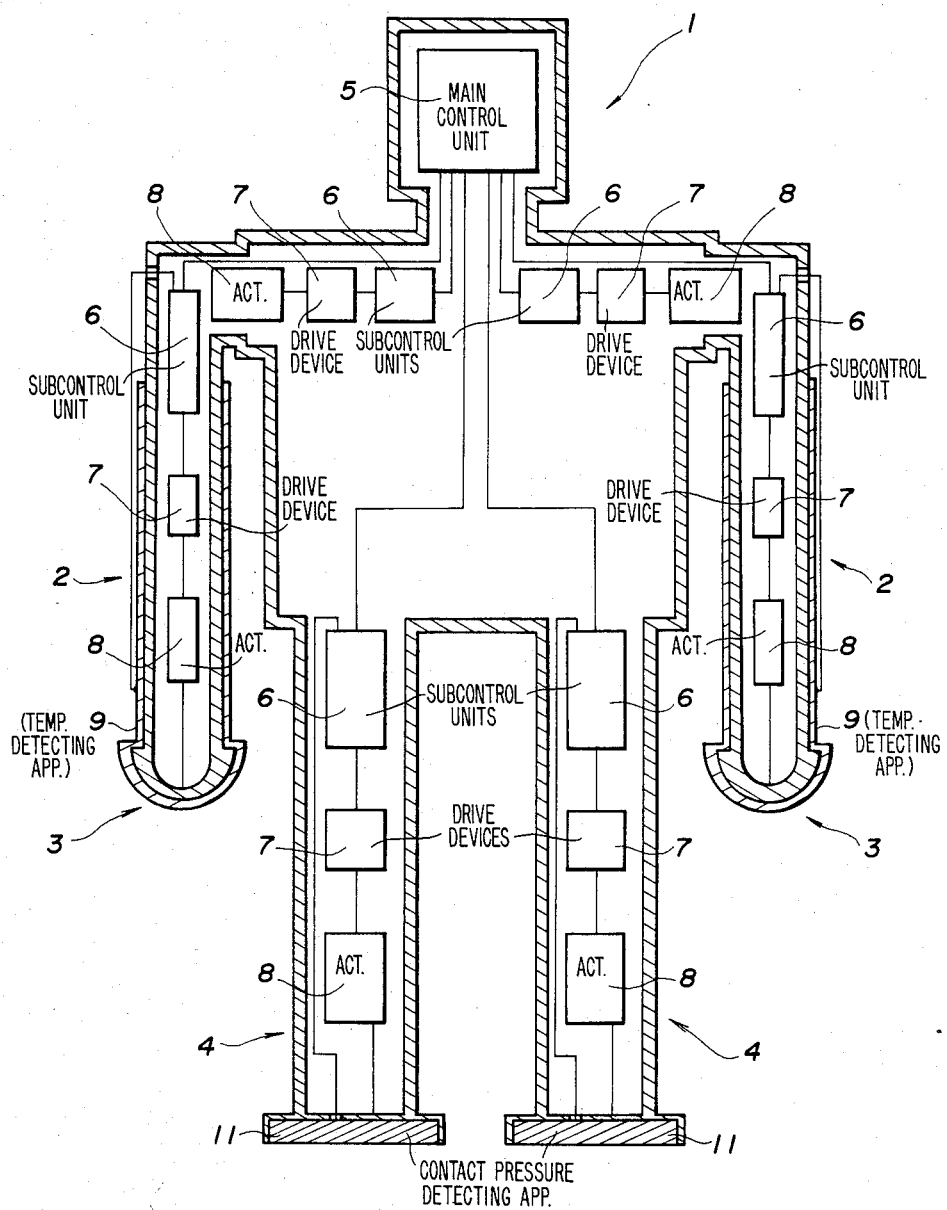
FIG. 1 is a block diagram showing an embodiment of the circuit construction of the control system of the robot of the present invention.
Figure 2:
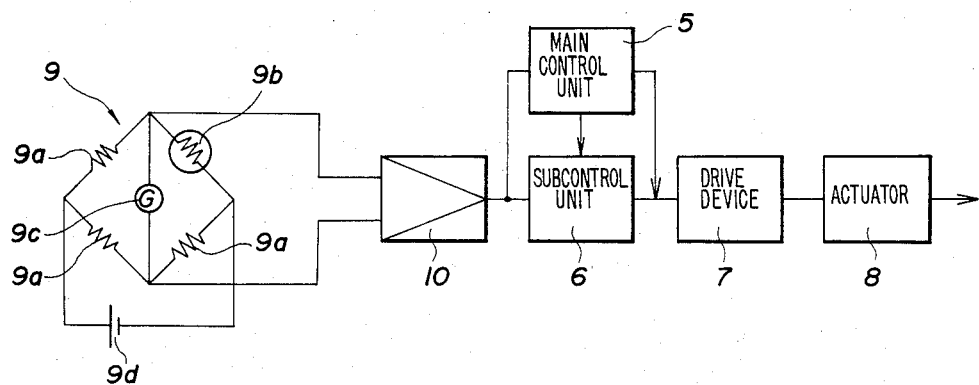
FIG. 2 is a block diagram showing an embodiment of the circuit which connects temperature detecting apparatus and the main and subcontrol units in a certain operating portion of the robot shown in FIG. 1.
Figure 3:
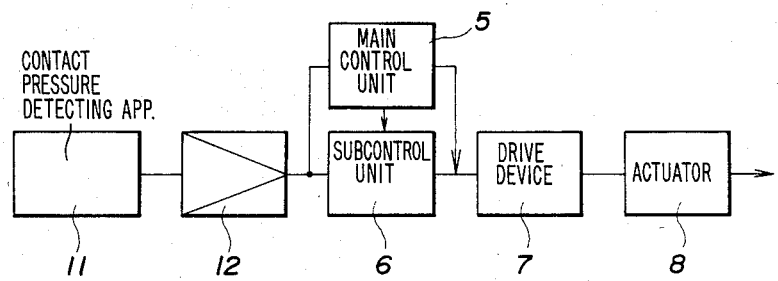
FIG. 3 is a block diagram showing an embodiment of the circuit construction which connects contact pressure detecting apparatus and the main and subcontrol units in a certain operating portion of the robot shown in FIG. 1.

Referring to FIGS. 1, 2 and 3, there is shown an embodiment of the robot of the present invention. In the figures, reference numeral 1 indicates a body of a robot; 2 and 2 show arms; 3 and 3 are hands; 4 and 4 are legs; 5 is a main control unit; 6 and 6 are subcontrol units such as a microcomputer or the like; 7 and 7 are driving devices; 8 and 8 are actuators; 9 and 9 are temperature detecting apparatuses; 9a and 9a are resistors; 9b is a semiconductor element such as a thermistor which has a negative temperature coefficient; 9c is a galvanometer; 9d is a power source; 10 is an amplifier for amplifying the output of the temperature detecting apparatus 9; 11 is a contact pressure detecting apparatus; and 12 is an amplifier for amplifying the output of the contact pressure detecting apparatus 11, respectively.

The body of the robot 1 is made of light metal, plastic, or various composite materials, etc. A plurality of detecting apparatuses 9, 9, 11, and 11 are attached to the outer surfaces of each operating portion. These apparatuses are used to detect temperatures and contact pressures or the like for each of the above-mentioned operating portions.

The main control unit 5 and a plurality of subcontrol units 6 are mounted in the robot 1. The main control unit 5 controls the overall operations of the robot, and the subcontrol units 6 individually control each operating portion such as the arms 2, hands 3, legs 4, etc. in accordance with outputs from the main control unit 5 and outputs from the above-mentioned plurality of detecting apparatuses 9, or 11. The driving devices 7 such as a motor, which are mounted in each of the arms, hands and legs, are operated in accordance with signals from the above-stated subcontrol units 6. As a result, the respective actuators 8 serve to expand, contract or rotate any of the arms 2, hands 3, and legs 4.

Each of the temperature detecting apparatuses 9 which are attached on the surfaces of the hands 2 constitutes a bridge circuit which comprises the three resistors 9a, 9a and 9a, and one thermistor 9b as shown in FIG. 2. This bridge circuit is well balanced in a normal ambient temperature for the robot, and no current flows through the galvanometer 9c.

When the robot 1 or a hand approaches some heat source while it is working, the resistance of the thermistor 9b in the bridge circuit drops, which circuit constitutes the temperature detecting apparatus 9 which is disposed on the portion approaching the heat source. Hence, the above-mentioned bridge circuit is unbalanced and a current flows through the galvanometer 9c. The amplifier 10 then amplifies this change and sends a signal to the main control unit 5 and the subcontrol unit 6. When the main control unit 5 receives the signals simultaneously from the amplifiers 10 which are mounted on the hands, in other words, when the robot 1 itself approaches the heat source, it operates to stop the operations of the whole robot in accordance with the predetermined program. However, when any one of the operating portions of the robot approaches the heat source, and in the case where there is, accordingly, no need to stop the operating functions of the entire robot, each of the subcontrol units 6 operates to individually stop or change the operation of only the operating portion which approaches the heat source among, for example, the arms 2 and 2, hands 3 and 3, or legs 4 and 4, in accordance with the predetermined program.

As described above, according to the present invention, when each operating portion approaches a heat source, the operations such as stoppage or the like for each operating portion is controlled individually by the respective subcontrol unit. Therefore, the control can be performed in an extremely short time, e.g. within 10 msec. This response time is far faster than that in the conventional control system in which the control is performed by the main control unit.

Furthermore, since each operating portion is separately controlled by the subcontrol units in such an urgent case as described above, it is not necessary to prepare every program for urgent control in the main control unit with respect to all operating portions. Therefore, the program for the main control unit can be simplified and the responsive speed thereof is also improved. In addition, since the controls in each operating portion is distinctly divided, when some fault occurs, the failed portion can be easily found, and the daily maintenance is also simplified.

If it is desired to have the robot work together with workers in a factory, the aforementioned thermistor 9b is always maintained to be at a certain temperature to keep the balance in the bridge circuit. When a worker or the like approaches a part of the operating portions in this state, the retaining heat of the thermistor is lost due to its approach, so the temperature thereof drops. Then a resistance value of the thermistor 9b increases and the bridge circuit is unbalanced. Therefore, it is signaled to perform the control of each portion according to this change.

On the other hand, the contact pressure detecting apparatuses 11 and 11 comprise a pressure sensitive element such as a semiconductor, a pressure sensitive resistance changing elastic element, or the like. These pressure detecting apparatuses do not operate in a normal pressure contact state during working operations in the same way as the case of the above-described temperature detecting apparatuses 9 and 9. However, when a contact pressure which is larger than an ordinary pressure is applied to the body of the robot 1 or one of the legs 4 and 5, the contact pressure detecting apparatus 11 detects the change and sends a detection signal to the amplifier 12. The amplifier 12 then amplifies this signal and sends it to the main control unti 5 and the subcontrol unit 6 which corresponds to the leg. As described previously in the temperature detecting apparatus, the main control unit 5 serves to stop the operation of the whole robot if it is necessary. In the case where only the operation of any one of the legs is to be stopped, the subcontrol unit 6 corresponding to the leg serves to stop the operation of the leg or move the leg to any other place in accordance with the predetermined program.

If the robot has to work in a location near a heat source or where an excessive contact pressure is exerted, the foregoing temperature and pressure detecting apparatuses are all kept inoperative. Or else, in the case where heat is at any time added or a pressure is applied to only a particular operating portion, it may be possible to stop only the operation of the subcontrol unit 6 of the corresponding operating portion or the detecting apparatus of that portion.

In the above embodiment, the output of the amplifier 10 or 12 is simultaneously sent to both main control unit 5 and the subcontrol unit 6; however, it may be sent to only the subcontrol unit.

Figure 4:
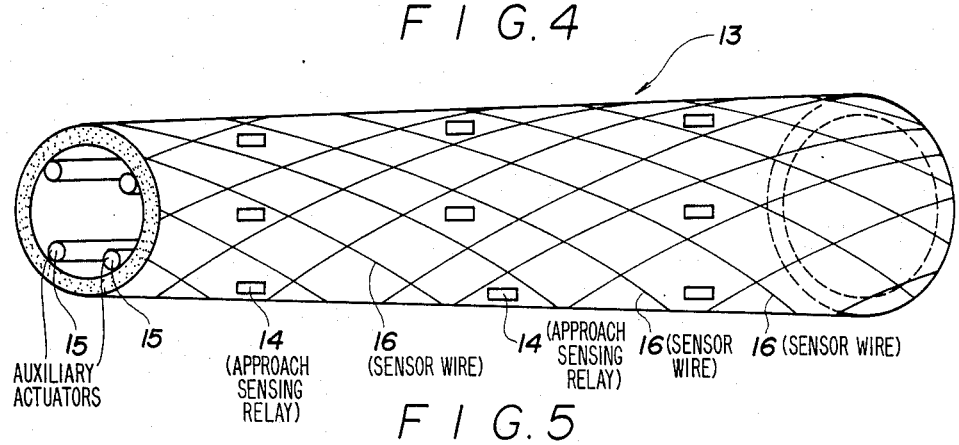
FIG. 4 is a schematic illustration showing another embodiment of the detecting device for detecting contact with an external object, which device is attached on the surface of each arm of the robot of the invention.
Figure 5:
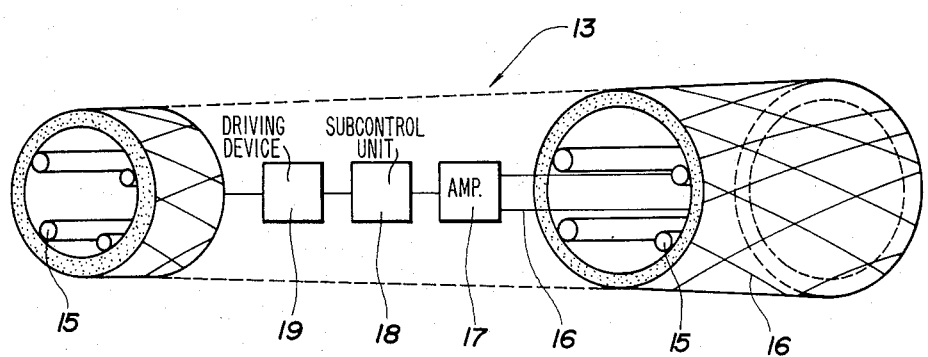
FIG. 5 is a schematic illustration with a part cut away for describing the detecting device shown in FIG. 4.
Figure 6:
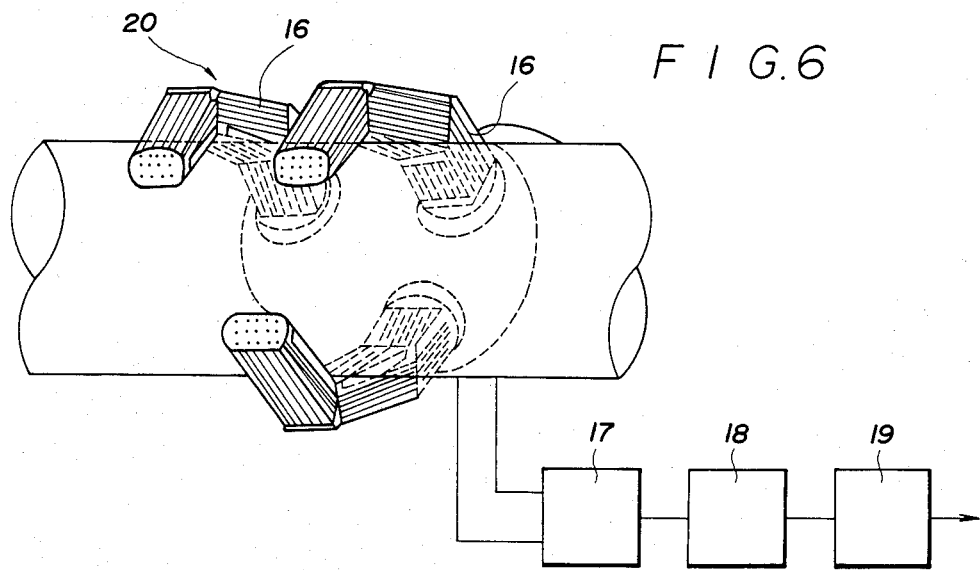
FIG. 6 is a schematic illustration showing an embodiment of the detecting device for detecting contact with an external object, which device is attached on the surface of each hand of the robot of the invention.
Figure 7:
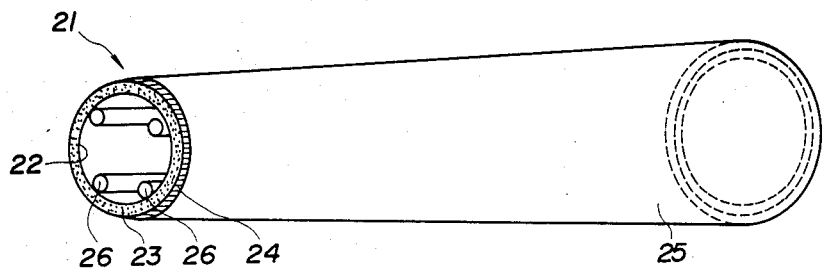
FIG. 7 is a schematic illustration showing another embodiment of the detecting device for detecting contact with an external object, which device is attached on the surface of each arm of the robot of the invention.
Figure 8:
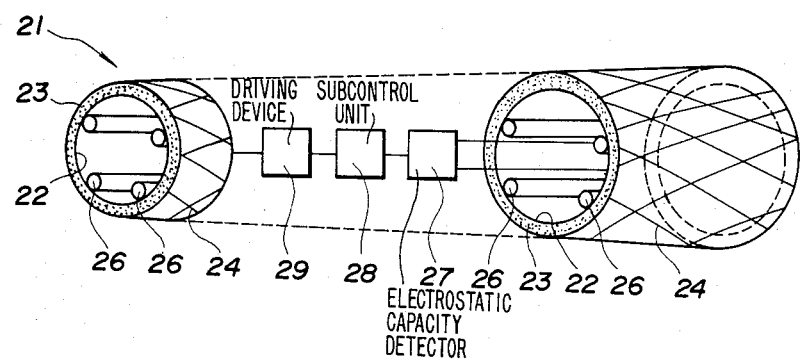
FIG. 8 is a schematic illustration with a part cut away for describing the detecting device shown in FIG. 7.
Figure 9:
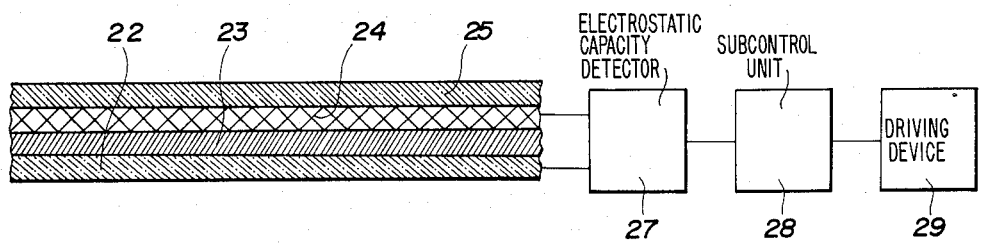
FIG. 9 is an enlarged cross section of the detecting device shown in FIG. 7.
Figure 10:
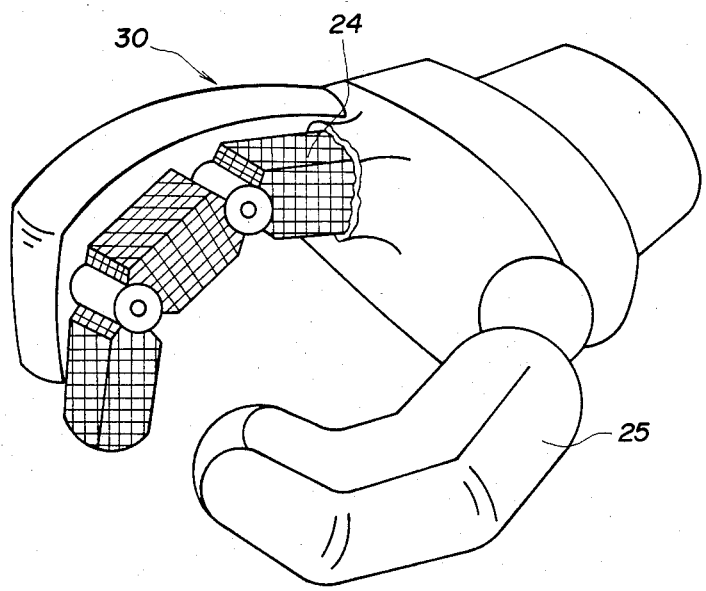
FIG. 10 is a schematic illustration showing an embodiment of the detecting device for detecting contact with an external object, which device is attached on the surface of each hand of the robot of the invention.

Referring now to FIGS. 4, 5 and 6, there is shown another embodiment of the detecting device for detecting contact with an external object. This device is attached on the surfaces of the operating portions of the robot.

Each of these detecting devices comprises a number of copper-nickel alloy wires as a constantan wire or the like which is attached on the surface of the body of the robot, especially the operating portion. A voltage is always applied to these wires, and when the body of the robot or any operating portion happens to contact a human body or other object, the voltage being applied changes. The contact with an object is detected by detecting this change.

Returning to FIGS. 4, 5 and 6, reference numeral 13 denotes a part of the arm of the robot; 14 and 14 show approach sensing relays; 15 and 15 are auxiliary actuators which are mounted in the arm to move the arm; 16 and 16 are sensor wires; 17 is an amplifier; 18 is a subcontrol unit which functions in the same manner as already described in FIGS. 1 to 3; 19 is a driving device; and 20 is a hand of the robot, respectively.

The body of the arm 13 is made of a resin consisting of acrylic resin, epoxy resin, or the like, or a similar material. As shown in FIG. 5, the arm 13 includes in it the amplifier 17, the subcontrol unit 18 such as a microcomputer to control the arm 13, a plurality of auxiliary actuators 15 and 15, a driving device 19 such as a motor which makes the arm 13 expand, contract and rotate through the actuators 15 and 15 in accordance with a signal from the subcontrol unit 18. A plurality of approach sensing relays 14 and 14 are attached on the surface of the arm. A number of sensor wires 16 and 16 are also attached on the entire surface of the arm. Each sensor wire is connected to the amplifier 17. The sensor wires 16 and 16 may use copper-nickel alloy wires such as a constantan wire or the like, or other alloy wires which have a property similar to this. The same sensor wires 16 and 16 are likewise attached on the surface of the hand 20.

Voltages at very low level are applied to all of the sensor wires 16 and 16, so when the arm 13 or the hand 20 of the robot contacts an obstacle during working, the above-mentioned voltage in each wire drops. This voltage change is detected by the amplifier 17, which amplifies and sends a detection signal thus amplified to the subcontrol unit 18. The subcontrol unit 18 then sends a command signal to immediately stop the operation of the arm 13 or the hand 20 or to move them away from the obstacle.

If a conductive material such as a metal or the like is to be gripped by the hand 20, the operation of the amplifier 17 has to be stopped at need. Otherwise, the power supply to only the sensor wires 16 and 16 in the portion which will contact the metal is stopped according to the predetermined program.

On the other hand, a plurality of approach sensing relays attached on the surface of the arm 13 are used to sense the distance from the arm to an obstacle. When the arm approaches the obstacle, the relays 14 and 14 generate a signal and transmit to the subcontrol unit 18. The subcontrol unit 18 then controls each operating portion individually.

Even if an obstacle approaches or contacts the arm 13 and the hand 20 from any directions, the above-described detecting apparatuses can detect it; thus, the dead angles of the conventional detecting devices are completely eliminated.

Referring to FIGS. 7 to 10, there is shown another embodiment of the detecting devices for detecting contact with an external object. These detecting devices are to be attached on the surfaces of the operating portions of the robot of the present invention.

In the detecting device shown in the figures, a first electrode is formed by covering the surface of the body of the robot, especially the operating portion with a conductive material. The surface of the first electrode is covered with an elastic dielectric material such as composite material or rubber, etc. A second electrode is formed by further covering the surface of the above-mentioned dielectric material with expandable and flexible wires or the like. In this way, the entire surface of the body of the robot, especially the operating portion is constituted as a capacitor assembly which comprises the first and second electrodes and the dielectric layer. Moreover, the whole surface of this capacitor assembly is covered with an expandable rubber film. A voltage is applied across both electrodes. In this state, when the body of the robot or the operating portion contacts other object, it causes the electrostatic capacity of the above-mentioned capacity assembly to change. Thus, the contact with an object is detected by detecting that change.

Referring again to FIGS. 7 to 10, reference numeral 21 shows an arm of the robot; 22 indicates a first electrode of a conductive material which is coated on the circumferential surface of the arm 21; 23 is a layer of a dielectric material such as composite material or rubber, etc. which covers the outer surface of the first electrode 22; 24 is a second electrode consisting of flexible wires or the like which is attached on the outer surface of the dielectric material layer 23; 25 is a rubber film covering the outer surface of the second electrode 24; 26 and 26 are auxiliary actuators for moving the arm 21, which actuators are mounted in the arm; 27 is an electrostatic capacity detecting apparatus including a proper AC bridge and a generator, etc.; 28 is a subcontrol unit such as a microcomputer which individually controls the operation of each arm; 29 is a driving device; and 30 is a hand of the robot, respectively.

In the same manner as the construction of the arm 21, the surface of the hand 30 is covered with the first electrode of a conductive material. The outer surface of the first electrode is covered with the dielectric material consisting of composite material or rubber, etc. The second electrode 24 comprising flexible wires or the like further covers the outer surface of the dielectric material layer. The most outer surface is covered with the rubber film 25.

A terminal for measuring the electrostatic capacity of the AC bridge which is built in the electrostatic capacity detecting apparatus 27 is connected between the first electrode 22 and the second electrode 24. It is now assumed that the arm 21 or the hand 30 of the robot comes into contact with an obstacle while it is working, the obstacle pressing the elastic dielectric material 23 through the rubber film 25 and the second electrode 24 on the surface of the arm of the hand. Thus, the spacing between the elctrodes 22 and 24 becomes narrow, resulting in increase of the electrostatic capacity of the capacitor assembly which is formed on the surface of the arm or the hand. When the change in this electrostatic capacity exceeds a predetermined value, it is detected by the galvanometer in the AC bridge of the electrostatic capacity detecting apparatus 27. This detection signal is sent to the subcontrol unit 28, which then sends a command signal to control the driving device 29, thereby to immediately stop the operation of the arm or the hand.

If the hand 30 is used to grip an object, it may be possible to stop the detecting function of the electrostatic capacity detecting apparatus 27 in only the portion adapted to grip the object.

By using the above-described detecting devices, it is possible to detect that an obstacle contacts the arm 21 and the hand 30 from any direction. Hence, the dead angles of the conventional detecting devices are completely eliminated.

In this embodiment, the whole surface of the capacitor which is formed on the surface of the operating portion of the robot is covered by a rubber film; however, any other expandable material having an insulating property may be used. It may be possible to detect the change in impedance due to change in electrostatic capacity of the capacitor.

Figure 11:
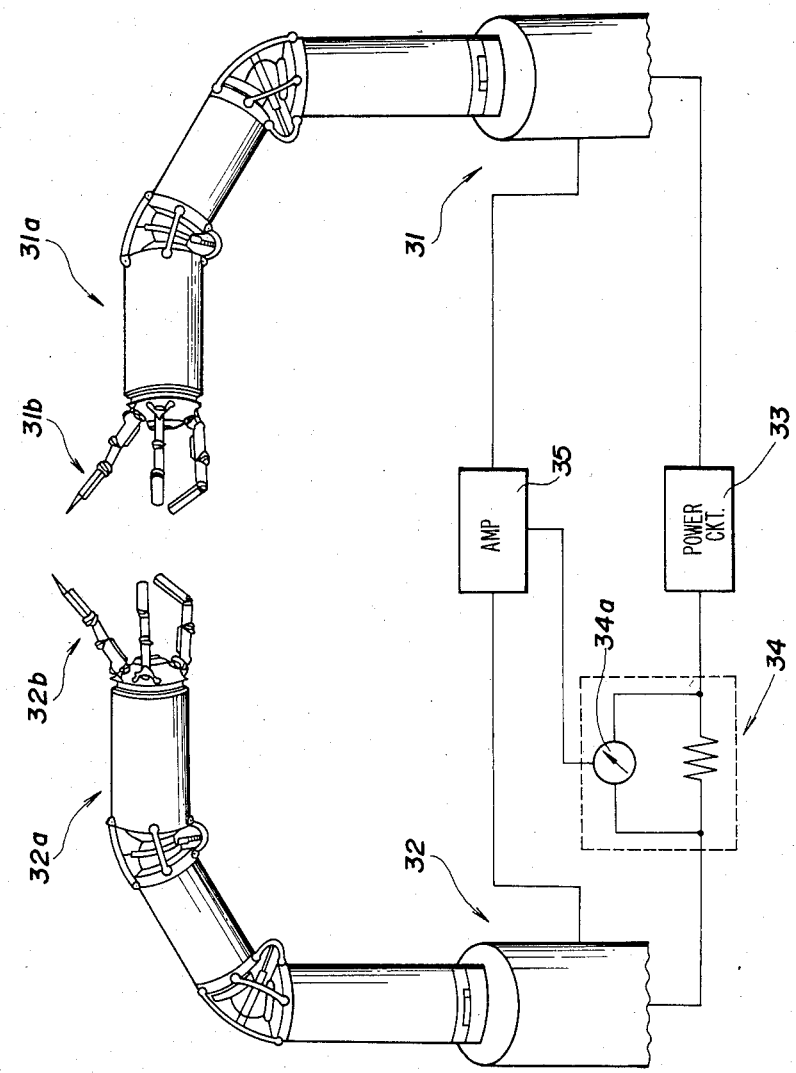
FIG. 11 is a schematic illustration showing an embodiment of the detecting device for detecting the approach to an external object, which device is attached to the robot of the invention.

Referring to FIG. 11, there is shown an embodiment of the detecting device for detecting the approach to an external object, which device is attached to the robot.

The detecting device in this embodiment comprises a power circuit for applying an AC voltage between the body of the robot, particularly the operating portion and an external object which it may contact, and an electrostatic capacity detecting apparatus for measuring the electrostatic capacity between the above-mentioned external object and the robot. The approach to the object is detected by detecting the change in the electrostatic capacity.

In FIG. 11, reference numeral 31 indicates a robot; 32 is another robot according to the invention which is working near the robot 31, 31a and 31b are an arm and a hand of the robot 31; 32a and 32b are an arm and a hand of the robot 32; 33 is a power circuit for applying an AC voltage between the robots 31 and 32; 34 is an electrostatic capacity detecting apparatus such as an AC bridge or the like; 34a is a galvanometer; and 35 is an amplifier for amplifying a detection signal of the electrostatic capacity detecting apparatus 34, respectively.

In the same manner as the previous embodiments, the subcontrol units and the driving devices or the like are equipped in each of the arms and the hands of the robot. The subcontrol unit serves to individually control the operation of the arm or the hand. The driving device is used to move the arm or the hand through the auxiliary actuator in response to a command from the subcontrol unit.

The surfaces of the arms and the hands of both robots are similarly covered by an expandable conductive material or the like. Thus, the whole surfaces form the electrodes. An AC voltage is applied between both electrodes from the power circuit 33. Each of the electrodes formed on the surfaces of the arm and the hand is connected respectively to the terminals for measuring the electrostatic capacity of the AC bridge in the electrostatic capacity detecting apparatus 34.

Assuming that the robots 31 and 32 which are working near one another approach very closely, the electrostatic capacities between the electrodes on the surfaces of the arm and the hand of both robots increase. When the changes in those electrostatic capacities exceed predetermined values, they are detected by the galvanometer 34a in the AC bridge of the electrostatic capacity detecting apparatus 34. The detection signals are amplified by the amplifier 35 and fed to the subcontrol units which individually control the arm and the hand. The subcontrol units then send command signals to the driving devices on the basis of those amplified detection signals to make the driving devices operative, thereby immediately stopping the operations of the arms and the hands of the robots.

By using the above-described detecting devices, it is possible to detect the approach of both robots to the arm and the hand from any direction. Thus, the dead angles of the conventional detecting devices are completely eliminated.

In the above embodiment, the approach between the two robots 31 and 32 is sensed; however, in the case of sensing the approach between the robot and an obstacle, the above-stated detecting device may be connected between the obstacle and the robot. It may be possible to detect the change in impedance due to change in electrostatic capacity.

Figure 12:
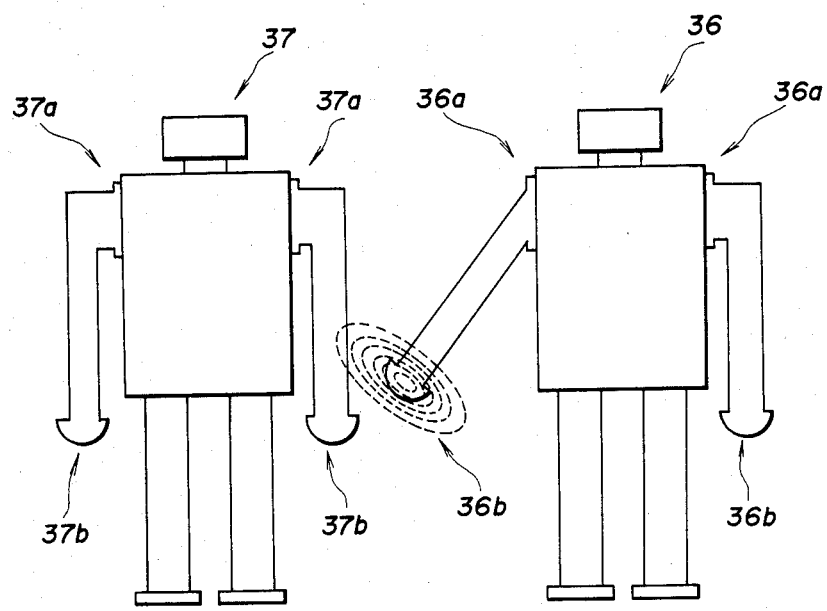
FIG. 12 is a schematic illustration showing another embodiment of the detecting device for detecting the approach to an external object, which device is attached to the robot of the invention.
Figure 13:
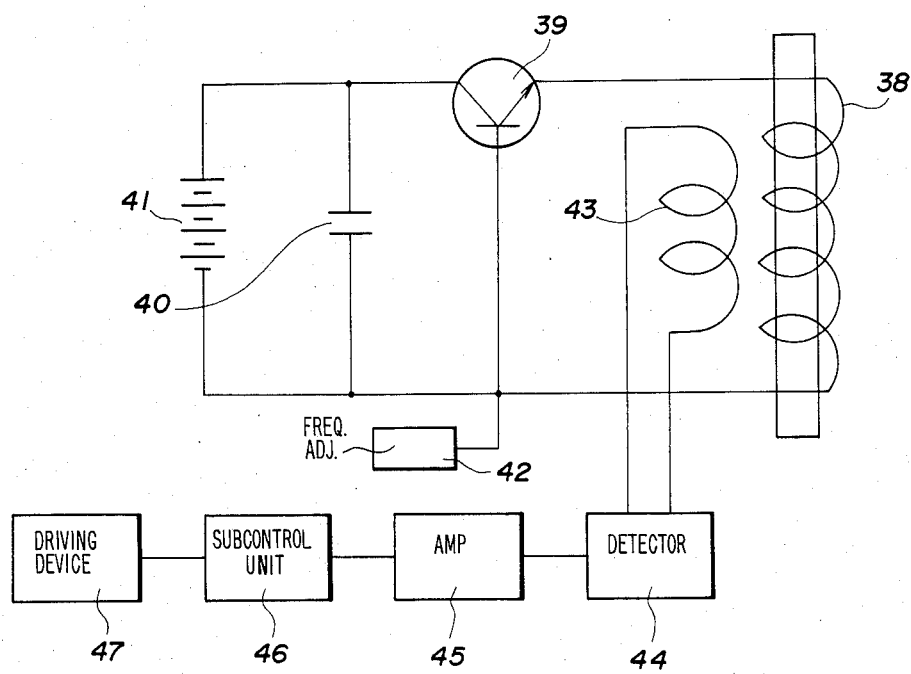
FIG. 13 is a block diagram showing an embodiment of the circuit construction of the detecting device shown in FIG. 12.

Referring now to FIGS. 12 and 13, there is shown another embodiment of the detecting device for detecting the approach to an external object, which device is attached to the robot of the invention.

The detecting device in this embodiment comprises a generating coil for generating a magnetic field around the body of the robot, especially the operating portion, and a detecting apparatus for detecting change in output of the generating coil. The approach to an object is detected by detecting the change in output of the generating coil when the robot approaches other objects.

In FIGS. 12 and 13, reference numeral 36 indicates a robot according to the present invention; 36a and 36a, and 36b and 36b respectively show arms and hands of the robot 36. A number of expandable, thick, sheet-like magnetic materials are distributed on each surface of the above-mentioned arms 36a and 36a and the hands 36b and 36b. Each of the magnetic materials is so constituted that the magnetic layer is cut appropriately and the gap in the cross section forms the magnetic gap. Hence, many magnetic materials consisting of such a number of magnetic gaps are attached on each surface of the arms and hands. Reference numeral 37 is another robot which is working near the robot 36; 37a and 37a and 37b and 37b are arms and hands of the robot 37 which are made of magnetic material such as metal or the like. Numeral 38 shows a generating coil which produces the magnetic field to radiate the magnetic force from each of above-mentioned magnetic gaps on the arms 36a and 36a and the hands 36b and 36b to the outsides of the surfaces thereof. A number of these generating coils are equipped at proper locations in the body of the robot 36 and in each operating portion. 39 is a transistor; 40 is a capacitor; 41 is a power source; 42 is a frequency adjusting device for automatically adjusting or setting frequencies of an AC current into a desired value, which AC current is supplied to the generating coil 38. Numeral 43 indicates a receiving coil for receiving the change in magnetic field to be produced by the generating coil 38; 44 is a detecting device for detecting the change in output of the receiving coil 43; 45 is an amplifier for amplifying a detection signal of the detecting device 43; 46 is a subcontrol unit such as a microcomputer or the like which individually controls the operation of the arms or the hands; and 47 is a driving device, respectively.

The arms 36a and 36a and the hands 36b and 36b are equipped with the generating coil 38 respectively. An AC current of low frequency of 10 Hz–10 KHz, preferably 10 Hz to about 300 Hz is supplied to the above-mentioned generating coil through the transistor 39. Consequently, the magnetic force which is produced from the generating coil is radiated outward from the surfaces of the arms 36a and 36a and the hands 36b and 36b.

It is now assumed that either of the metal arms 37a and 37a or the metal hands 37b and 37b approaches the arms 36a and 36a or the hands 36b and 36b, and the magnetic field which is formed around them changes.

The detecting device 44 detects this change in magnetic field through the receiving coil 43 and sends a detection signal to the amplifier 45. The amplifier 45 amplifies it and sends signals to the subcontrol unit 46. The subcontrol unit 46 then sends a command signal to the driving device 47 to stop immediately the operations of the arms 36a and 36a and the hands 36b and 36b.

In the case where workers work near the robot 36, it is possible to avoid collision of the robot with the workers by the following methods; a plurality of stickers of a magnetic material are adhered on the clothing or helmet, etc. of the worker; or the worker wears clothing made of fibers which include magnetic powders; whereby the robot 36 senses the magnetic field change produced by those magnetic materials.

As the magnetic detecting apparatus on the robot 36, it may be possible to use the detecting apparatus which is disclosed in Japanese Patent Publication No. 50-19940.

The various embodiments of the detecting devices which are equipped in the robot according to the present invention have been described with reference to FIGS. 4 to 13; however, the detecting devices are not limited to them. Namely, all of the conventional well-known detecting apparatuses can be used as the detecting apparatus for detecting the approach or contact of the robot with obstacles. It may be possible to provide the robot in which the various changes in exterior environment around the robot can be sensed and each operating portion can be immediately controlled in response to these changes in addition to the above-mentioned methods of detecting the approach or contact of the robot with the obstacles. That is to say, various detecting devices are provided in the robot to detect such changes as temperature, pressure, light, sound, gases, humidity, magnetic force, radiation, etc. in accordance with the purpose of the robot.

Figure 15:
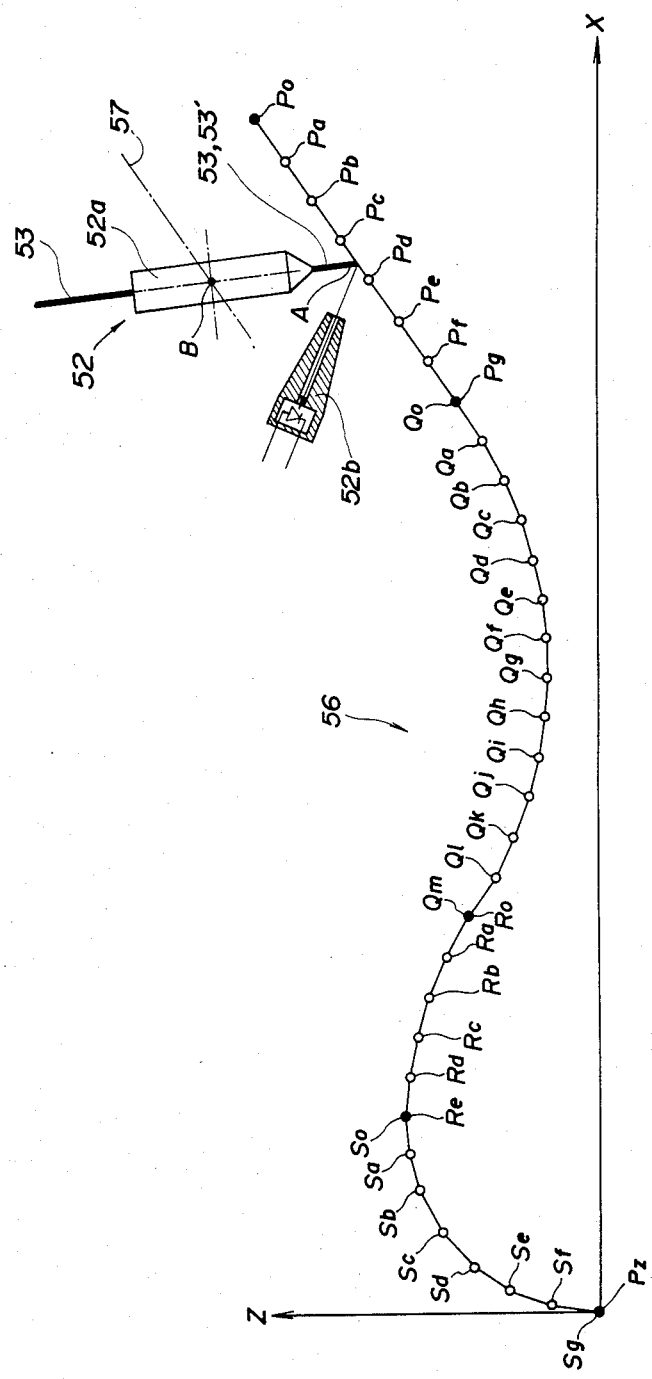
FIG. 15 shows the relationship between the moving course of the operating portion of the welding robot shown in FIG. 14 and the locus of the specific point which is set manually.
Figure 16:
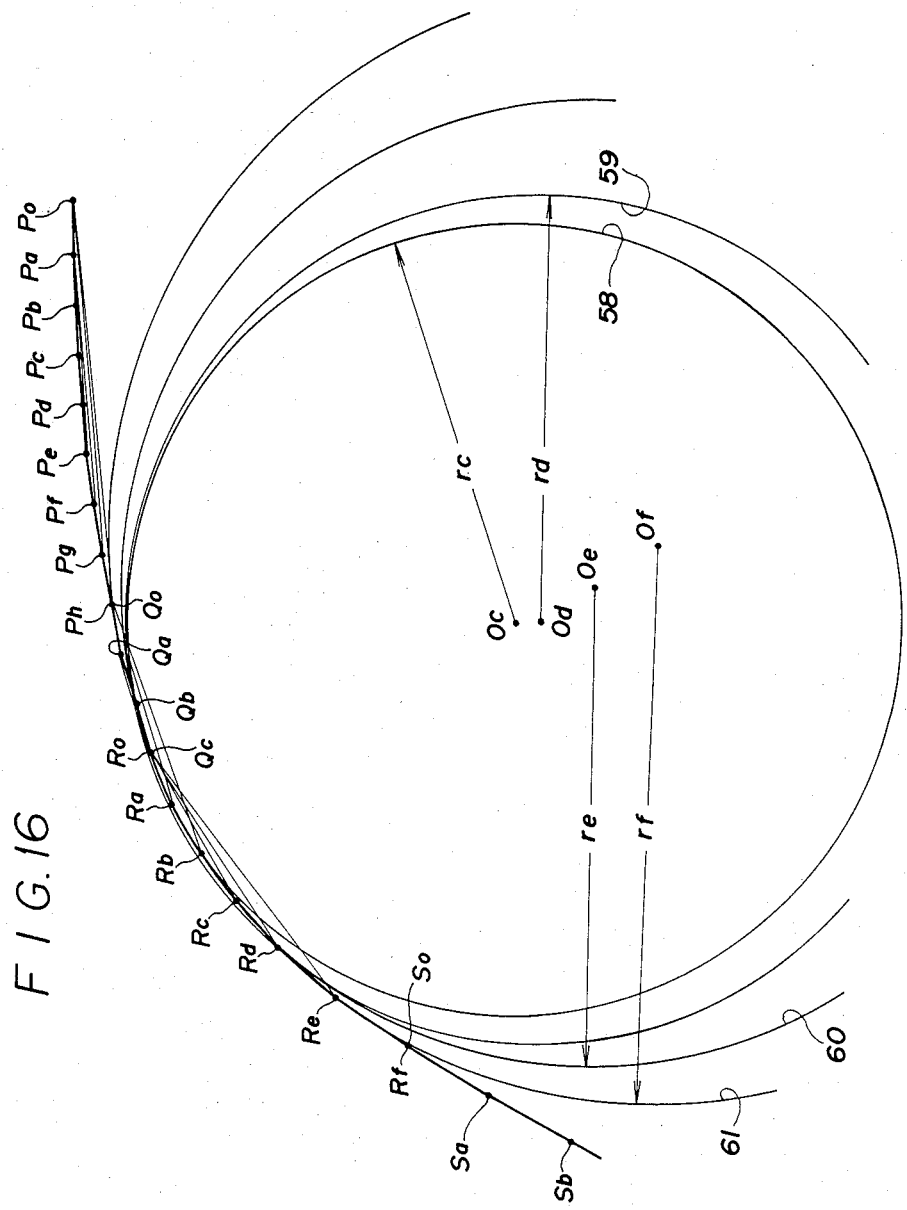
FIG. 16 shows a specific example for describing the learning function of the robot of the invention.

Referring now to FIGS. 14 to 16, there wil be next described an embodiment of the robot of the present invention in which the subcontrol units for individually controlling each operating portion have learning functions.

The learning function mentioned above does not mean that the robot operates in compliance with only the predetermined programs, but it means that, for example, when the operating portion is moved manually, independently or forcibly by the profiling apparatus or the like, the cooperating process can be immediately memorized thereafter, and the operating process can be repeated at any time.

The advanced robot having such a learning function is called a multi-functional robot and recently it is being widely used in various fields including factories or the like. This type of robot can perform the same complicated or precise task as those of human workers. The functions of the robot of this type have been far improved recently as compared with the conventional one; on the contrary, as the control circuits or the like advance, higher speed and larger capacity have been, therefore, required.

However, as in the robot of the present invention, if it is desired that the subcontrol units be equipped in each operating portion and the learning function are provided in each of the subcontrol units, as already described as the fourth object of the invention, it is disadvantageous to use the subcontrol units each having large capacities. Therefore, the respective learning function is executed by a small control unit having a relatively small capacity.

Described hereinafter is an optimum learning function to accomplish the above-mentioned objects of the present invention.

Briefly described, the learning function is realized by the following method; that is, the complicated moving course of a specific point on the operating portion of the robot is simplified by replacing by straight lines and circular arcs, and the above-mentioned specific point is moved along the course thus simplified.

In FIGS. 14 to 16, reference numeral 51 denotes a robot which is provided with a welding head 52; 53 is a welding rod; 54 and 55 are steel shells to be welded; 56 is a welding line. The robot 51 comprises a rotary base 51a, arms 51b, 51c, 51d and 51e, and universal joints 51f, 51g and 51i. The welding head 52 is equipped with a welding rod feeding apparatus 52a and an arc watch 52b as shown in FIG. 15.

In the same manner as described before, the robot 51 includes actuators for individually operating each portion, a servo control unit, various sensors, calculating apparatuses, an encoder, driving units, power sources, etc. The welding head 52 further has an automatic welding rod feeder, a weaving system, a welding current control circuit, etc. All of these are well known, so their explanations are omitted herein for the purpose of simplicity and they ar not shown as well.

The robot 51 shown in FIG. 14 corresponds to the robot 1 shown in FIG. 1 or robot 31, 32 shown in FIG. 11, and the whole motion of robot 51 is controlled by its main control unit and the individual motions of the universal joints 51f, 51g and 51i are controlled by their subcontrol units.

In FIG. 14, the shells 54 and 55 are fixed by a fixture and a fitting base (not shown). They are welded along the welding line 56 by the robot 51 and the welding head 52.

As shown in FIG. 15, an appropriate dummy 53' is first attached in place of the welding rod 53 before welding. The arms 51b, 51c, 51d, and 51e are moved manually. Point A at the end of the dummy 53' (i.e. the point corresponding to the arc point of the welding rod 53) is contacted with the welding line 56, while moving from start point Po to end point Pz.

The operating state of the robot 51, i.e. the rotation angle change rates of the universal joints 51f, 51g and 51i are recorded in a memory system (not shown), so that, thereafter, the same process as the above mentioned operating state can be repeated at any time.

In this state, the dummy 53' is removed and the welding rod 53 is supplied and by operating the welding head 52, it is possible to weld the shells 54 and 55.

The actual welding line 56 is defined by a cubic curve having a curvature and a torsion. However, it is assumed that the welding line 56 is a quadratic curve on the xz plane as shown in FIGS. 14 and 15 for the purpose of simplicity in explanation.

In case of using the cubic Cartesian coordinates, the welding head 52 is moved in accordance with the simultaneous single-dimensional, two-dimensional or three-dimensional operation on the basis of the set unit (normally, 10 $\mu$m to 100 mm) in each coordinate axis direction in correspondence with the system construction. The above-mentioned unit may be set to proper magnitudes depending upon the portions such as the arm or the like.

Furthermore, the attitude of the welding head 52 itself must be actually controlled. Thus, the locus of point A, namely a locus 57 of reference point B in addition to the welding line 56 must be also recorded and controlled. Point A corresponds to the central point of the arc shown in FIG. 15. Reference point B is provided in the welding head 52.

Only the control for point A is first described hereinbelow. The dummy 53' is attached in place of the welding rod 53, and point A at the end thereof is manually moved along the welding line 56. The angles of each of the universal joints 51f, 51g and 51i are read by the encoder (not shown) and sequentially recorded in each appropriate time interval and in each moving distance while point A is being moved.

According to the conventional method, when the actual welding work is performed, the changes in angles of these universal joints 51f, 51g and 51i are traced and reproduced, thereby the point of the welding rod 53 is moved along the welding line 56. Since the welding rod 53 is rapidly consumed, it is the cross point of the central line of the welding rod feeding apparatus 52a and the optical axis of the arc sensor 52b to be controlled directly by this conventional method. Therefore, the welding rod feeding apparatus 52a is used to feed the welding rod 53 so that the arc on the point of the welding rod 53 always appears in the visual area of the arc sensor 52b, whereby to assure the proper supply for the consumption of the welding rod.

Hence, in the conventional method, it is necessary to use a memory system having an extremely large capacity to record in detail the angles of each of the universal joints 51f, 51g and 51i.

According to the invention, the learning function of the robot can be accomplished by the following method. That is to say, the angles of the universal joints 51f, 51g and 51i are partially and temporarily recorded. All of them are not recorded for a long time. The locus of point A of the welding rod 53 is calculated on the basis of the data which has been partially and temporarily recorded. The locus is discriminated to determine whether any portion on the locus can be approximated by a straight line or not. If there is some portion which can be approximated by a straight line, it is so approximated. The remaining portions which cannot be approximated by straight lines are replaced by approximate circular arcs. In this way, a composite curve consisting of circular arcs and straight lines is obtained which is continuous from the start point to the end point of the above-mentioned locus. The data of these straight lines and circular arcs are recorded in place of the angular data of the universal joints 51f, 51g and 51i. When performing the actual welding operation, the robot 51 is controlled by applying the well-known numerical control techniques such as the linear interpolation and the arc interpolation, thereby accomplishing a desired purpose.

In FIG. 15, it is now assumed that point A is moved from start point Po to end point Pz along the welding line 56.

The angular data of the universal joints 51f, 51g and 51i are sequentially recorded which corresponds to start point Po and subsequent points Pa, Pb, Pc, Pd, .... This data has values which are integer times of the set unit angle. The values on the xz coordinates of points Pa, Pb, Pc, Pd, ... are successively calculated on the basis of that data.

In this case, it is recommended that the distribution of the initial angular data are to be well balanced, and that the intervals between each value on the xz coordinates of each point to be calculated are to be set to proper unit length in each coordinate axis direction or to approximately constant value.

The operation proceeds to the processing for discrimination of whether each interval which is subsequent to point Po can be approximated by a straight line or not.

If it is possible, the straight line is obtained which can cover each interval of the locus as long as it is within a predetermined permissive error.

Specific examples for these calculations will be described hereinlater with reference to FIG. 16.

In FIG. 15, the segment between points Po and Pg designates the longest straight line segment which can substitute for the locus of point A in this interval. This segment PoPg can be adopted.

In the next interval, end point Pg of the previous interval is replaced newly by start point Qo. Then, it is checked whether the subsequent interval can be approximated by a straight line or not. As seen from FIG. 15, the approximation by straight line is impossible in this case. Therefore, an approximate circular arc QoQm is obtained which can approximate the longest interval within a predetermined permissive error. In like manner, the approximate circular arcs RoRe and SoSg are obtained.

Those points are further specifically described with respect to FIG. 16.

FIG. 16 shows a part of the welding line 56, on which a number of passing points Pa, Pb, Pc, ..., Qo, Qa, Qb, ..., Ro, Ra, Rb, ..., So, Sa, ... are shown together with start point Po.

It is needless to say that the states of the robot 51 are measured and recorded at each passing point. Only a limited number of passing points are indicated in FIG. 16 for the purpose of simplicity. However, a great number of passing points are actually set with very fine pitch.

The following method is recommended to detect the straight line. Straight line PoPc is first obtained which connects start point Po and a passing point which is spaced from start point Po, for instance, third passing point Pc from Po. The distances between passing points Pa and Pb, which are located between points Po and Pc, and the above-mentioned straight line PoPc are then calculated. These distances, i.e. the deviations from the above-mentioned straight line PoPc are checked to determine whether they are within the range of a fixed permissive common difference or not. When both distances Lca and Lcb are less than the permissive common difference E, it is determined that the approximation by the straight line is possible. If not, the approximation by a straight line is impossible, so the approximation by the circular arc is adopted.

This common difference is ordinarily set to the range of ±E. However, in some case, positive and negative signs are used for the above-mentioned distance L and this common difference is set to the range of +E to O, or +Ea to −Eb, or the like.

In the case where the approximation by the straight line is possible, the longest segment which can substitute is obtained.

The distance Lij at each intermediate passing point Pj is calculated in the same manner as described above with respect to the straight lines which connect start point Po and passing points Pd, Pe, ..., Pi, ... after passing point Pc.

The longest segment among the segments PoPi which can satisfy the inequality $$E \geq Lij$$

with respect to all intermediate passing point Pj is a desired solution. Segment PoPh shown in FIG. 16 corresponds to its solution, wherein i=h. Therefore, segment PoPh is adopted as the actual course to move the point A in this interval.

Then, passing point Ph changes to start point Qo in the next interval. As already described above, segment QoQc is adopted and point Qc then changes to start point Ro in the next interval.

In the following interval which starts from start point Qc, either of the distances Lca and Lcb between the segment which connects points Ro and Rc and respective intermediate points Ra and Rb exceeds the common difference E, so it is concluded that approximation by a straight line is impossible.

In this case, a circle (in FIG. 16, a circle 58 having a center Oc) is first obtained. This circle passes points Ro and Rc and any one of the intermediate passing points, e.g. Ra. The distance Lcb between this circular arc RoRc and remaining passing point Rb is calculated. If it satisfies the inequality $$E \geq Lcb,$$

the moving course in this interval can be substituted by this circular arc RoRc.

This circular arc can be obtained by suitably selecting the number of passing points between points Ro and Rc in accordance with the curvature of the curve.

Even in this case, it is desirable to adopt as long a circular arc as possible.

Similarly, circles 59, 60, 61, etc. are obtained. The circle 59 has a center Od and passes points Ro, Rb and Rd. The circle 60 has a center Oe and passes points Ro, Rc and Re. The circle 61 has a center Of and passes points Ro, Rc and Rf .... The distances Lij between each of those circles and each of the remaining passing points are calculated. Thus, the longest circular arc which is within the range of common difference is selected. Circular arc RoRf corresponds to it in the example shown in FIG. 16.

In this way, the same calculation is repeated to obtain the moving course which comprises the straight lines and circular arcs and which is continuous from the first start point Po to the final end point Pz which are indicated in FIGS. 14 and 15.

Although the actual moving locus of a specific point is not always smooth when the robot is manually operated, the moving course to be derived by the above-described method becomes a substantially smooth and continuous curve.

When the robot is actually and manually operated, the moving states of each portion of the robot are usually unnatural, so they are not always ideal.

However, according to the invention, the data of these straight lines and curves are recorded and then the corresponding specific point is moved along those moving courses in response to the form and degree of freedom of the robot; therefore, the most desirable operating method is calculated.

The data to be recorded ordinarily in the coordinates of the start and end points in the case of the straight line, and the coordinates of the start and end points and the central point of curvature in the case of the circular arc.

For the operations of the robot in the actual work, the arms 51b, 51c, 51d, and 51e are operated through actuators by means of the well-known straight line interpolation and the circular arc interpolation on the basis of this data.

According to the invention, the states of the universal joints 51f, 51g and 51i, or the arms 51b, 51c, 51d and 51e at the time of initial and manual setting are partially and temporarily recorded, but they are not recorded while the robot is working. Therefore, the motion of the robot at the time of actual work is not always identical to the motion at the time of manual setting. Namely, the optimum motion is adopted to accomplish the desired purpose.

In the above embodiment, the case where the robot executes the two-dimensional motion is described for simplicity; however, it will be easily understood that the same processing can be performed when the robot executes three-dimensional motion.

Briefly described, the procedures for performing the three-dimensional motion comprise the following steps (a) to (f).

(a) The step in which the locations of a specific point to be controlled, i.e. the passing points are calculated and temporarily recorded. These locations correspond to each state of the robot. These states are sequentially and time divisionally recorded to specify the motion of the robot.

It is desired to set the distances between each passing point or the components in the x, y and z axis directions into units of 0 or 1 (for example, 1 μm).

(b) The straight line checking step in which the longest line segment is obtained. This longest segment is selected among the segments which connect the moving start point (Xo, Yo, Zo) of the above-mentioned specific point the "i"th passing point (Xi, Yi, Zi) from this moving start point (Xo, Yo, Zo), (wherein "i" is larger than a predetermined minimum limit value i-min). In that longest segment, all of the distances Lij do not exceed the permissive error E and the value of i is maximum. The above-mentioned distances Lij are the distances between the segment which connects the start point (Xo, Yo, Zo) and the passing point (Xi, Yi, Zi) and each passing point (Xj, Yj, Zj), (wherein j=1, 2, ..., (i−1)), which is located between the above-mentioned two points.

(c) The straight line interval setting step to be executed when the solution i=n is obtained in step (b). The segment which connects the start point (Xo, Yo, Zo) and the point (Xn, Yn, Zn) is set as the interval for the straight line. The data of this segment is recorded.

(d) The circular arc checking step to be executed when no solution is obtained in step (b). The optimum circular arc is obtained, in which all of the distances Dkl do not exceed the permissive error E and the value of j is maximum. This optimum circular arc is selected among the circular arcs which are defined by the following three points: that is to say, the moving start point (Xo, Yo, Zo); the "k"th passing point (Xk, Yk, Zk) from this moving start point (Xo, Yo, Zo), (wherein k is larger than a predetermined minimum limit value k-min); and an arbitrary passing point (Xs, Ys, Zs) which is located on the curve between the above-mentioned two points. The above-mentioned distances Dkl are the distances between the above-mentioned circular arc and other passing points (Xl, Yl, Zl) which are located on the curve between the above-mentioned two points.

(e) The circular arc interval setting step to be executed when the solution j=m is obtained in step (d). The circular arc which connects the start point (Xo, Yo, Zo), and the passing points (Xs, Ys, Zs) and (Xm, Ym, Zm) is set as the interval for circular arc. The data of the above-mentioned circular arc is recorded at need.

(f) The repeating calculation step to set the moving course which is continuous over the entire interval. The end point (Xn, Yn, Zn) or (Xm, Ym, Zm) of the interval is obtained in step (c) or (e). This end point is newly set as the start point. Then, the same calculation as the straight line checking step (b) is executed. In like manner, the same processings in steps (b) to (e) are successively repeated with respect to the passing points from the start point to the final moving end point (Xz, Yz, Zz). And the continuous moving course is set.

The three-dimensionally smooth and continuous moving course is obtained by performing the above-described steps (a) to (f). Thus, it is possible to suitably control the robot by means of the well-known interpolating calculation.

In the above embodiment, the moving course is expressed by using the Cartesian coordinates system for simpler explanation; however, other coordinate systems such as the polar coordinate system, the cylindrical coordinate system, etc. may be used.

In the above embodiment, the controlling of only the locations of a single specific point is described; however, it is necessary to provide at least two specific points and to simultaneously control the locations thereof since the various attitudes of the welding rod feeding apparatus 52a or the like must be actually controlled. In such a case, the respective common differences per specific point should be determined and the controls are done while the restricting conditions between both specific points are satisfied.

The learning function of the invention can be applied to the control for all kinds of robots as well as the above-described welding robot. Furthermore, the higher order setting of the interval can be easily determined by using other methods such as the method of least squares, well-known statistical data processing methods, corrective calculation methods depending upon the use of the robot, etc., in addition to the above-described calculation method for setting the intervals with straight lines and circular arcs.

Consequently, by equipping such a learning function as described previously in the subcontrol units in the robot of invention, the high order work can be smoothly and securely controlled by means of the subcontrol units which have small capacities. It is recommended that the above-mentioned calculating steps of (a) to (f) for setting the moving courses of each operating portion be performed by the main control unit, and that only the result which is obtained by the above calculation should be recorded in the subcontrol units, thereby controlling the motions of each operating portion.

In the case where the robot of the invention has a few operating portions and, therefore, the number of the subcontrol units is small, it may be possible to provide such a learning function as mentioned above in the main control unit which controls the overall robot.

According to the present invention, with such a construction, each operating portion of the robot can be immediately operated in response to the changes in exterior environment.

Although preferred embodiments of the invention have been specifically illustrated and described herein, it will be appreciated that many modifications and variations of the present invention are possible in light of the above teachings and within the purview of the appended claims without departing from the spirit and intended scope of the invention.

What is claimed is:

1. A robot comprising: a plurality of operating portions, said robot having overall movements and individual movements of the respective operating portions, a main control means for controlling overall movements of the robot; at least one detecting means in each operating portion of the robot for detecting the exterior environment around each of said operating portions; and at least one subcontrol means for individually controlling the operations of each of said operating portions in accordance with output from said main control means and output from the respective said detecting means, means associated with at least one of said main control means and said subcontrol means for providing a learning function for the associated means by which when said operating portions of the robot are initially moved by an external force, the course of movement is memorized and thereafter the same motion can be repeatedly carried out, said means for providing a learning function when the operating portions of the robot are initially moved by an external force comprising means for producing a plot of the course of travel of a specific point on said operating portion during movement of said operating portion; means for dividing said course into a number of intervals; means for replacing the course of travel in each interval by an approximation of a straight line or a circular arc to produce an approximation course of travel consisting of straight lines and circular arcs; and means for memorizing the travel of said specific point along said approximation course of travel, said means for dividing said course of travel of the specific point into a number of intervals and said means for replacing the course of travel of each interval by the straight line or circular arc comprising:

(a) means for calculating and temporarily recording locations (designated as passing points) of said specific point corresponding to each state of the robot in the course of its motion, each of said states being sequentially and time-divisionally recorded to define the motion of the robot;

(b) means for effecting a straight line checking step in which the longest approximation line segment is determined, said segments connecting the starting point of the course of travel (Xo, Yo, Zo) and the "i"th passing point (Xi, Yi, Zi), (wherein "i" is larger than a predetermined minimum limit value i-min), said passing points being successively located on the course of travel from the starting point (Xo, Yo, Zo) to the end point (Xz, Yz, Zz), wherein all of deviation distances Lij do not exceed a permissive error E and the value of i is maximum, said distances Lij being defined by the distances between said longest segment and each passing point (Xj, Yj, Zj) which is located between said two points, (wherein j=1, 2, ..., (i−1));

(c) means for effecting a straight line interval setting step when the solution i=n is obtained in means (b), wherein the segment which connects the starting point (Xo, Yo, Zo) and the point (Xn, Yn, Zn)

is set as the interval for the straight line, the data of said segment being recorded;

(d) means for effecting a circular arc checking step when no solution is obtained in means (b), wherein an optimum circular arc is obtained, in which all of the deviation distances Dkl do not exceed the permissive error E and the value of j is maximum, said optimum circular arc being selected from circular arcs which are defined by three points consisting of the starting point (Xo, Yo, Zo), the "k"th passing point (Xk, Yk, Zk) from said starting point (Xo, Yo, Zo), (wherein k is larger than a predetermined minimum limit value k-min), and an arbitrary passing point (Xs, Ys, Zs) which is located between said two points, said distances Dk1 being defined by the distances between said circular arc and other passing points (Xl, Yl, Zl) which are located between said two points; means for effecting a circular arc interval setting when the solution j=m is obtained in means (d), wherein the circular arc which connects said starting point (Xo, Yo, Zo), and said passing points (Xs, Ys, Zs) and (Xm, Ym, Zm) is set as the interval for the circular arc, and the data of said circular arc are recorded; and (f) means for repeating the calculations to set the course of travel continuously over the entire interval, in which the end point (Xn, Yn, Zn) or (Xm, Ym, Zm) of the interval which is obtained by means (c) or (e) is set as the successive starting point, and the same calculations by means (b)–(e) are executed, and repeated successively for the passing points from said starting point to the final end point (Xz, Yz, Zz), to produce the continuous approximation course of travel.

2. The robot as claimed in claim 1 wherein each of said operating portions is provided with one of said subcontrol means.

3. The robot as claimed in claim 1 wherein each of said operating portions is provided with a plurality of said subcontrol means.

4. The robot as claimed in claim 1 wherein each said subcontrol means controls the respective operating portion in a time interval less than 10 m sec.

5. The robot as claimed in claim 1 wherein said detecting means detects temperature.

6. The robot as claimed in claim 1 wherein said detecting means detects pressure.

7. The robot as claimed in claim 1 wherein said detecting means detects contact with an external object.

8. The robot as claimed in claim 1 wherein said detecting means detects approach of the respective said operating portion to other objects.

9. The robot as claimed in claim 1 wherein said detecting means detects light.

10. The robot as claimed in claim 1 wherein said detecting means detects sound.

11. The robot as claimed in claim 1 wherein said detecting means detects gases.

12. The robot as claimed in claim 1 wherein said detecting means detects humidity.

13. The robot as claimed in claim 1 wherein said detecting means detects magnetic force.

14. The robot as claimed in claim 1 wherein said detecting means detects radiation.

15. The robot as claimed in claim 1 wherein a plurality of said detecting means are provided for detecting at least two parameters selected from the group consisting of temperature, pressure, contact with other objects, approach to other objects, light, sound, gases, humidity, magnetic force, and radiation.

16. The robot as claimed in claim 3 wherein said detecting means comprises a thermistor element.

17. The robot as claimed in claim 6, wherein said detecting means comprises a pressure sensitive element.

18. The robot as claimed in claim 7 wherein said detecting means comprises: a plurality of electrical wires on the surface of the body of said robot, including said operating portions; means for applying voltage to said wires; and voltage detecting means for detecting change in voltage applied to said electrical wires when said robot contacts other objects.

19. The robot as claimed in claim 18 wherein said electrical wires are constantan wires.

20. The robot as claimed in claim 18 wherein said electrical wires are copper-nickel alloy wires.

21. The robot as claimed in claim 17 wherein said detecting means comprises: a first electrode consisting of a conductive material which covers the surface of the body of said robot including said operating portions; an elastic dielectric material which covers the surface of said first electrode; a second electrode consisting of an expandable conductive material which covers the surface of said dielectric material; an elastic insulating material which covers the surface of said second electrode; and electrostatic capacity detecting means for detecting change in electrostatic capacity between said first and second electrodes when said robot contacts other objects.

22. The robot as claimed in claim 21 wherein said second electrode comprises flexible wires.

23. The robot as claimed in claim 8 wherein said detecting means comprises electrostatic capacity detecting means for measuring electrostatic capacity between the body of said robot, including said operating portions, and external objects which approach the same.

24. The robot as claimed in claim 8 wherein said detecting means comprises: generator means for generating a magnetic field around the body of the robot, including said operating portions; and means for detecting change in output of said generator means due to approach of external objects to said robot.

25. A method of controlling a robot having a plurality of operating portions comprising controlling overall movements of the robot by a main control unit, controlling individual movement of each operating portion by at least one subcontrol unit for each operating portion, detecting ambient conditions around each operating portion and halting movement of said operating portion when ambient conditions around such operating portion are abnormal, and wherein at least one of said main control unit or said subcontrol units effects a learning function comprising the steps of, when the operating portions of the robot are intially moved by an external force, memorizing the course of movement and thereafter repeatedly carrying out the same motion, and further wherein when the operating portions of the robot are initially moved by the external force, the learning function is obtained by the steps comprising obtaining the course of travel of a specific point on a respective said operating portion; dividing said course of travel into a number of intervals; replacing the course of travel of each interval by a straight line or a circular arc to obtain an approximation of the course of travel; and moving said specific point along the approximation course of travel, said steps of dividing the course of travel of the specific point into a number of intervals and of replacing the course of travel of each interval by the straight line or circular arc comprising the steps (a) to (f) as follows:

(a) calculating and temporarily recording locations (designated as passing points) of said specific point corresponding to each state of the robot in the course of its motion, each of said states being sequentially and time-divisionally recorded to define the motion of the robot;

(b) effecting a straight line checking step in which the longest approximation line segment is determined, said segments connecting the starting point of the course of travel (Xo, Yo, Zo) and the "i"th passing point (Xi, Yi, Zi), (wherein "i" is larger than a predetermined minimum limit value i-min), said passing points being successively located on the course of travel from the starting point (Xo, Yo, Zo) to the end point (Xz, Yz, Zz), wherein all of deviation distances Lij do not exceed a permissive error E and the value of i is maximum, said distances Lij being defined by the distances between said longest segment and each passing point (Xj, Yj, Zj) which is located between said two points, (wherein j=1, 2, ..., (i−1));

(c) effecting a straight line interval setting step when the solution i=n is obtained in step (b), wherein the segment which connects the starting point (Xo, Yo, Zo) and the point (Xn, Yn, Zn) is set as the interval for the straight line, the data of said segment being recorded;

(d) effecting a circular arc checking step when no solution is obtained in step (b), wherein an optimum circular arc is obtained, in which all of the deviation distances Dkl do not exceed the permissive error E and value of j is maximum, said optimum circular arc being selected from circular arcs which are defined by three points consisting of the starting point (Xo, Yo, Zo), the "k"th passing point (Xk, Yk, Zk) from said starting point (Xo, Yo, Zo), (wherein k is larger than a predetermined minimum limit value k-min), and an arbitrary passing point (Xs, Ys, Zs) which is located between said two points, said distances Dkl being defined by the distances between said circular arc and other passing points (Xl, Yl, Zl) which are located between said two points;

(e) effecting a circular arc interval setting step when the solution j=m is obtained in step (d), wherein the circular arc which connects said starting point (Xo, Yo, Zo), and said passing points (Xs, Ys, Zs) and (Xm, Ym, Zm) is set as the interval for the circular arc, and the data of said circular arc are recorded; and (f) repeating the calculation steps to set the course of travel continuously over the entire interval, in which the end point (Sn, Yn, Zn) or (Xm, Ym, Zm) of the interval which is obtained in step (c) or (e) is set as the successive starting point, and the same calculations in steps (b)–(e) are executed, and repeated successively for the passing points from said starting point to the final end point (Xz, Yz, Zz), to produce the continuous approximation course of travel.

26. A method as claimed in claim 25 wherein said subcontrol unit effects the step of controlling the operation of the associated operating portion within 10 m sec of a command signal to said operating portion.

27. A method as claimed in claim 25 wherein the ambient conditions detected around each operating portion is at least one of the parameters selected from the group consisting of temperature, pressure, contact of said operating portion with an external object, approach of said operating portion to an external object, light, sound, gases, humidity, magnetic force and radiation.

28. A method as claimed in claim 25 wherein a plurality of said specific points are monitored and all calculations and operations are executed with respect to all of said specific points while restricting conditions between said specific points are satisfied.

29. A robot as claimed in claim 1, said at least one subcontrol means being self-contained and controlling the operation of a respective operating portion independently of said main control means and in response to output from said detecting means in the respective operating portion.

* * * * *